United States Patent [19]

Cain et al.

[11] 3,721,659

[45] March 20, 1973

[54] TREATMENT OF RUBBER

[75] Inventors: Maurice Edward Cain, Welwyn Garden City; Geoffrey Thomas Knight, Shefford; Keith Frederick Gazeley; Peter McHigh Lewis, both of Hitchin, all of England

[73] Assignee: The Natural Rubber Producers' Research Association, London, England

[22] Filed: Nov. 16, 1970

[21] Appl. No.: 90,138

[30] Foreign Application Priority Data

Nov. 28, 1969 Great Britain.....................58,403/69

[52] U.S. Cl. ..............260/83.3, 260/85.1, 260/92.3, 260/94.7 A
[51] Int. Cl. ...............................................C08d 5/02
[58] Field of Search ..260/72.5 R, 83.3, 85.1, 94.7 A, 260/781, 799, 808, 45.9 R, 92.3

[56] References Cited

UNITED STATES PATENTS 1,869,657    8/1932    Bowers............................260/45.9 R

*Primary Examiner*—Donald E. Czaja
*Assistant Examiner*—M. J. Welsh
*Attorney*—Wenderoth, Lind & Ponack

[57] ABSTRACT

Novel urethane reaction products of aromatic nitroso compounds with isocyanates are used to improve the resistance of unsaturated rubbers to oxidative degradation by providing antioxidant groups bound to the rubber molecules. Dry rubber or rubber latex is conveniently reacted with decomposition products of the urethane during normal vulcanization.

6 Claims, No Drawings

TREATMENT OF RUBBER

Our co-pending Application No. 752174, filed Aug. 13, 1968, and now abandoned relates to a process for improving the resistance to degradation of unsaturated natural and synthetic rubbers and to the improved rubbery polymers prepared by the process. More particularly, our co-pending application is concerned with the formation of a rubber-bound antioxidant which is formed by the chemical reaction of an aromatic nitroso compound with the molecules of the rubbery polymer.

Our said co-pending application makes use of aromatic nitrosophenols and nitrosoanilines in which the nitroso group is directly attached to an aromatic ring, preferably in the para-position to the hydroxyl or amine group. Such compounds are not very pleasant to handle, and objections of possible toxicity and dermatitic activity have been raised against them. Also, they significantly reduce the scorch time of, and may peptize the rubber in, rubber mixes into which they are introduced. The present invention is an improvement in or modification of the basic invention of Application Ser. No. 752174 in which the necessity of handling the aromatic nitroso compounds as such in order to admix them with the rubber is avoided, and in which peptization of the rubber and reduction in scorch time of the rubber mix is lessened.

The present invention provides a process for improving the resistance to degradation of an unsaturated natural or synthetic rubber by providing antioxidant groups bound to the rubber molecules, which process comprises providing a mixture of the rubber with a urethane having the general formula

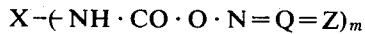

where, X is an organic group of functionality m,

Q is an aromatic group in the quinonoid configuration,

Z is an oxygen atom or an imino group,
and m is an integer equal to 1 or more, and heating the mixture at a temperature of up to 250°C for from 1 minute to several days.

The invention is useful for both natural and synthetic polymers containing unsaturated carbon-carbon linkages, or other groups capable of suitable reaction with the aromatic nitroso compounds defined above, but is not suitable for use with rubbers normally regarded as saturated polymers which contain very low amounts of unsaturation for vulcanization purposes, for example, ethylene-propylene terpolymers and butyl rubber. Examples of synthetic rubbers to which the invention is applicable are cis-polyisoprene, polybutadiene, styrene-butadiene copolymers, acrylonitrile-butadiene copolymers and polychloroprene. The invention is applicable to unsaturated natural or synthetic rubbers both in the latex and in the dry form.

The nature of the group X is not critical to this invention. The group X may be regarded as the non-functional residue of the isocyanate starting material. The group X will generally be inert, and will often be an aliphatic, aromatic or aliphatic-aromatic group (of functionality m) containing carbon and hydrogen only.

It will be understood that the value of m is equal to the functionality of the isocyanate used as a starting material.

Q is preferably a phenylene or substituted phenylene group in the quinonoid configuration. When Z is an imino group, Q is preferably an unsubstituted p-phenylene group in the quinoid configuration.

A convenient way of making these novel compounds is by heating the appropriate mono-C-nitrosoaniline or mono-C-nitrosophenol with the appropriate organic isocyanate.

The aromatic nitroso compound which is one component of the urethane is preferably one in which the nitroso group is joined to the arylene group in the para-position to the hydroxyl or —NHR group. The arylene group may be a phenylene or a substituted phenylene group, provided always that the nitroso compound is capable of forming a urethane with an organic isocyanate. The group R may be a $C_1$ to $C_6$ alkyl group or a phenyl group, or may be any other substituent, provided again that the nitroso compound is capable of forming a urethane with an organic isocyanate. Examples of suitable aromatic nitroso compounds are 4-nitrosodiphenylamine, N-hexyl-4-nitrosoaniline, 4-nitrosophenol, 6-nitrosothymol, 2,6-dimethyl-4-nitrosophenol, 2-methyl-4-nitrosophenol, and 2,6-di-isopropyl-4-nitrosophenol.

The nature of the organic isocyanate, which is the second component of the urethane, is not critical. It may be a mono-isocyanate, for example phenyl isocyanate, or a di- or poly-isocyanate, for example toluene-2,4-di-isocyanate, 4,4'-di-isocyanatodicyclohexylmethane, or 4,4'-di-isocyanatodiphenylmethane.

The urethane may be prepared by conventional methods by warming the aromatic nitroso compound with the organic isocyanate, optionally in the presence of an inert solvent, for example to a temperature of from 50° to 110° C for from 10 to 60 minutes.

Preferably substantially equivalent amounts of the two reactants are used, e.g. so as to provide from 0.8 to 1.2 isocyanate groups for reaction with each aromatic nitroso molecule. The course which is believed to be followed during the reaction may be represented as follows:

1. Nitrosophenols
   a. HO — Ar — N=O ⇌ O=Q=NOH
   b. 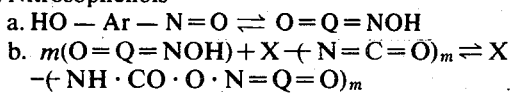
2. Nitrosoanilines
   a. R·HN — Ar — N=O ⇌ R·N=Q=NOH
   b. 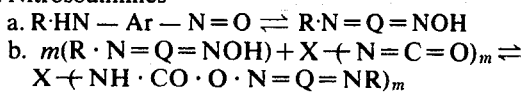

Reaction (a) in each of these two schemes is the reversible formation of an oxime from the nitroso compound. The equilibrium of this reversible reaction, which is heavily on the left hand side of the equation under normal circumstances, is displaced to the right by removal of the oxime as it is formed through reaction (b). Reaction (b) takes place on warming the reactants together. In fact, reaction (b) is also reversible, since the urethanes reaction products decompose on being heated to their melting points to give the aromatic nitroso compound and free isocyanate; it is on this decomposition that the rubber treatment process of this invention depends.

When nitrosophenols are used, reaction (b) goes quickly and readily. When nitrosoanilines are used, the reaction goes less readily, and it may be necessary to use a relatively reactive organic isocyanate. We have found that aromatic isocyanates, and particularly aromatic di-isocyanates are more reactive in this reaction than aliphatic isocyanates. The use of catalysts may also be advantageous.

It will be noted that the reaction scheme for nitrosoanilines requires the presence of at least one hydrogen atom attached to the amine nitrogen atom. We have found that the reaction does not work if unsubstituted nitrosoanilines are used, because substituted ureas are formed in preference to urethanes.

The compounds described above are not true urethanes, being the reaction products of isocyanate with =NOH, rather than with —COH. Their full chemical names are, however, complex, and they are referred to, for convenience, in this specification and claims as urethanes.

The amount of the urethane used in the process of the invention is preferably such as to provide from 0.2 to 3.0 percent by weight of the aromatic nitroso compound based on the weight of the rubbery polymer, more preferably 0.2 to 2.0 percent for latex compositions and 0.5 to 3.0 percent for dry rubber compositions.

In the case of latex compositions, the mixture of the rubber with the urethane may be formed by mixing solutions or ball-milled dispersions of the urethane with the rubber latex, followed as desired by air-drying, coagulation, dipping or foaming by well known techniques.

In the case of dry rubber mixes, the urethane may be added to the rubber during normal compounding, care being taken that the temperature of the mixture does not rise to such an extent as to cause premature decomposition of the urethane.

It is believed that the urethane reversibly decomposes at an elevated temperature to give the aromatic nitroso compound which then reacts with the rubber, and an organic isocyanate. The temperature of decomposition of the urethane depends on its structure, but we have found that the desired reaction can generally be achieved by heating a dry rubber mixture at a temperature of from 100° to 250° C, preferably from 140° to 180° C, for from 1 to 60 minutes, higher temperatures requiring shorter heating times. It is believed that the aromatic nitroso compound reacts with the rubber substantially as fast as it is liberated. For latex, lower temperatures are generally appropriate, for example, from 60° to 130° C, preferably 90° to 120° C. It may even be possible to obtain the desired reaction by leaving the latex mixture at ambient temperatures for some days. It may be that the alkaline hydrolysis of the urethane in the latex enables the desired reaction to take place at lower temperatures than are possible with dry rubber compositions.

The present invention can be used to protect raw or vulcanized rubber from oxidative degradation. Where the rubber is to be vulcanized, it is convenient to effect vulcanization using the same heating step. To this end, the heating step of the process of the present invention may be performed in the presence of such other fillers, additives, vulcanizing agents or other compounding ingredients as may be required for the final rubber product.

While the urethanes can be used to protect unsaturated rubbers generally from oxidative degradation by the process of this invention, it is preferable to select a urethane which decomposes in a temperature range appropriate to the rubber system to be protected. Thus, if it is desired to vulcanize a rubber latex composition containing a urethane at 100°C, it will generally be convenient to provide a urethane which decomposes to give a controlled slow release of the nitroso compound at 100° C; for example, the pre-reaction product of 6-nitrosothymol with toluene-2,4-di-isocyanate might be chosen for the purpose. Alternatively, if it is desired to vulcanize a dry rubber composition containing a urethane at 140° C, it will generally be convenient to provide a urethane which decomposes to give a controlled slow release of the nitroso compound at 140° C; for example, the urethane of 6-nitrosothymol with 4,4'-di-isocyanatodiphenyl methane might be chosen for the purpose.

It is believed that the reaction efficiency may be higher when a urethane is used than when the free nitroso compound is added direct to the rubber mix. Heating of the urethane-rubber mixture results in a controlled slow release of the nitroso compound which disappears, by reaction with the rubber, as fast as it is formed. It is thought that the presence, at any moment, of substantial quantities of free nitroso compound may reduce the reaction efficiency by initiating unwanted side reactions with intermediates.

If the urethane decomposes at too low a temperature, premature decomposition may take place, resulting in the presence in the rubber mix of substantial quantities of free nitroso compounds, which may reduce reaction efficiency and scorch time. If the urethane decomposes at too high a temperature, lengthy heating of the rubber mix may result in over-vulcanization.

The only really satisfactory way of determining the decomposition temperature of a particular urethane, under conditions where the nitroso compound is removed as it is formed, is to test the urethane in a rubber mix. It does, however, appear that the decomposition temperatures of these urethanes are roughly proportional to their melting points. It further appears that the melting points of urethanes formed by reacting the same nitroso compound with different isocyanates, depend on the reactivity of the isocyanate, being higher for more active (e.g., aromatic) isocyanates. The melting points of various urethanes are given below in Example 1.

In the Examples, which are included to illustrate the various aspects of the invention, the following abbreviations have been used:

Nitroso compounds
NDPA      4-nitrosodiphenylamine
HNA      N-hexyl-4-nitrosoaniline
NP      4-nitrosophenol
NT      6-nitrosothymol (2-isopropyl-5-methyl-4-nitrosophenol)
26 DMNP      2,6-dimethyl-4-nitrosophenol
2 MNP      2-methyl-4-nitrosophenol
3 PNP      3-isopropyl-4-nitrosophenol
26 DPNP      2,6-di-isopropyl-4-nitrosophenol
2 BNP      2-t-butyl-4-nitrosophenol
3 PNP      3-isopropyl-4-nitrosophenol
Isocyanates
PI      phenyl isocyanate
TDI      toluene-2,4-di-isocyanate
HW      4,4'-di-isocyanatodicyclohexylmethane

| | |
|---|---|
| MDI | 4,4'-di-isocyanatodiphenylmethane |
| Polymers | |
| NR | Natural rubber |
| SBR | styrene-butadiene copolymer |
| PB | polybutadiene |
| CR | polychloroprene |
| NBR | acrylonitrile-butadiene copolymer (40% acrylonitrile) |
| Additives | |
| CBS | N-Cyclohexylbenzthiazole-2-sulphenamide |
| ETU | Ethylene thiourea |
| MBT | Mercaptobenzthiazole |
| ZDEC | Zinc diethyldithiocarbamate |
| S(mc) | Magnesium carbonate-coated sulphur |

Examples 1 to 4 illustrate the preparation of urethanes. Parts and percentages are by weight throughout, and temperatures are in °C.

Example 1

The general method of preparation is as follows:

The mono-isocyanate (0.1 mole) or di-isocyanate (0.05 moles) is dissolved in sodium dry toluene (250 ml) in a 500 ml flask fitted with magnetic stirrer, nitrogen inlet and a reflux condenser protected by a calcium chloride drying tube. The solvent is flushed with nitrogen before addition of the isocyanate, the nitrogen inlet being well below the surface of the liquid, and a gentle nitrogen stream is maintained through the apparatus. The nitrosophenol (0.1 mole) is added and the mixture heated with stirring until solution is complete. The flask is allowed to cool, the precipitated urethane derivative removed by filtration, washed with toluene and light petroleum (b.p. 30°–40°) and dried under vacuum. It may be recrystallized from benzene.

By this general method, the following urethanes have been prepared.

TABLE 1

| Product | Melting Point | Yield |
|---|---|---|
| NP/PI | 133 – 145 | 57% |
| NP/HW | 154 – 156 | 87% |
| NP/TDI | 176 – 178 | 96% |
| NP/MDI | 190 – 195 | 95% |
| NT/PI | 131 – 132 | 95% |
| NT/TDI | 156 – 158 | 95% |
| NT/MDI | 193 – 195 | 95% |
| 26 DMNP/PI | 163 – 164 | 90% |
| 26 DMNP/HW | 208 | 40% |
| 26 DMNP/TDI | 175 | 64% |
| 26 DMNP/MDI | 225 | 80% |
| 26 DPNP/PI | 149 | 74% |
| 26 DPNP/HW | 126 | 70% |
| 26 DPNP/TDI | 167 | 55% |
| 26 DPNP/MDI | 195 | 95% |
| 2 BNP/TDI | 124 | 70% |
| 3PNP/HW | 157 – 160 | 23% |
| 3PNP/TDI | 180 | 83% |

It will be observed from this table that the melting points of urethanes formed from any particular nitrosophenol are in the order MDI>TDI>PI; it is found in practice that the decomposition temperatures of the urethanes varied in the same order. All the urethanes decomposed on melting.

EXAMPLE 2

Phenyl isocyanate (25 m moles) was dissolved in sodium dry toluene as above, and NDPA (23 m moles) added. The mixture was heated to reflux the toluene for 1 hour, the bath turned off and the flask allowed to cool overnight to room temperature. The black tarry solid was removed by filtration, and the filtrate cooled to −70°, when a brown solid separated. This was removed by filtration, washed with cold toluene, and dried under vacuum. The yield 15 percent, m.p. 100°–110° (dec.).

EXAMPLE 3

NDPA (0.1 mole) AND MDI (0.05 mole) were dissolved in sodium dry toluene (250 ml) under nitrogen as above and the solution heated in an oil bath at 100°–105° for one hour. The flask was allowed to cool to room temperature, the brown solid removed by filtration, washed with toluene and dried under vacuum. It had m.p. 160°–162° (dec.). the yield was 80 percent.

EXAMPLE 4

A solution of N-hexyl-4-nitrosoaniline (50 m moles) and MDI (25 m moles) in sodium dry toluene (150 ml) was prepared as above and triethylenediamine (4 mole % on HNA) added as catalyst. The solution was heated in an oil bath at 60° for 25 minutes, allowed to cool to room temperature and the green precipitate removed by filtration washed with toluene and dried under vacuum. The yield was 80 percent, m.p. 124° (dec.).

Identification of the derivatives

The absence of isocyanate groups was confirmed by the absence of the —NCO band at 2260 cm$^{-1}$ in the infra-red spectra. The urethane carbonyl band was present in all cases at 1,720–1,780 cm$^{-1}$, and in the nitrosophenol derivatives there was a quinone carbonyl band at 1650 cm$^{-1}$, showing that addition had occurred in the oxime form. The corresponding urea derivatives of the nitrosoanilines (reaction at the NH group) would have a typical band at 1660 cm$^{-1}$, and this was absent.

The following rubber formulations have been used in the Examples. In all the dry rubber cases, the urethane was added to the formulation on an open mill at a temperature not exceeding 60°C. In the case of the latex formulation F, the urethane was added as a ball-milled aqueous dispersion.

TABLE 2

| | A | B | C | Dry rubber D | E | Latex F |
|---|---|---|---|---|---|---|
| NR | 100 | | | | | 100 (from LA latex) |
| SBR | | 100 | | | | |
| PB | | | 100 | | | |
| CR | | | | 100 | | |
| NBR | | | | | 100 | |
| HAF black | | 50 | 50 | | | |
| SRF black | | | | 50 | 50 | |
| Processing oil | | 8 | 8 | | | |
| Stearic acid | 2 | 2 | 2 | | | |
| ZnO | 5 | 5 | 5 | 5 | 5 | 1 |
| MgO | | | | 4 | | |
| Coumarone resin | | | | | 6 | |
| CBS | 0.5 | 1.5 | 1.5 | | | |
| ETU | | | | 0.5 | | |
| MBT | | | | | 1 | |
| ZDEC | | | | | 1.5 | 1 |
| S | 2.5 | 1.5 | 1.5 | | | |
| S (mc) | | | | | 1.5 | 1 |
| Cure time min/°C | 40/140 | 30/153 | 30/153 | 30/150 | 40/150 | 30/100 |

EXAMPLE 5

The efficiencies of various urethanes at various levels of addition were evaluated by measurement of oxygen absorption rates at 100°C before and after extraction of vulcanized samples of the gum CBS/S formulation A with methanol/acetone/chloroform azeotrope. The results are given below in Table 3. The formation of antioxidant groups chemically bonded to the rubber molecule, so as to be non-extractable is clearly demonstrated.

TABLE 3

Rubber-bound antioxidants from nitrosophenol and nitrosoaniline urethane generators in a gum CBS/S vulcanizate oxidized at 100°

| No. | Nitroso compound | Isocyanate | Equivalent loading (pphr)* | Hours to 1% w/w absorption Unextracted | extracted |
|---|---|---|---|---|---|
| 1 |  |  |  | 20 | 3 |
| 2 | NP | PI | 1 | 29 | 19 |
| 3 | NT | PI | 2 | 24 | 12 |
| 4 | NT | TDI | 2 | 22 | 13 |
| 5 | NT | MDI | 1 | 26 | 10 |
| 6 | 26 DMNP | TDI | 2 | 20 | 15 |
| 7 | 26 DMNP | MDI | 1 | 21 | 9 |
| 8 | 26 DMNP | PI | 2 | 22 | 14 |
| 9 | 26 DMNP | HW | 1 | 22 | 11 |
| 10 | 26 DPNP | HW | 2 | 18 | 11.5 |
| 11 | 26 DPNP | TDI | 2 | 18 | 12 |
| 12 | 26 DPNP | MDI | 1 | 18 | 9 |
| 13 | 2 BNP | TDI | 1 | 18 | 16 |
| 14 | 3 PNP | TDI | 2 | 22 | 21 |
| 15 | 3 PNP | HW | 1 | 25 | 14.5 |
| 16 | NDPA | PI | 0.5 | 41 | 43 |
| 17 | NDPA | PI | 2 | 41 | 51 |
| 18 | NDPA | MDI | 0.5 | 44 | 39 |
| 19 | NDPA | MDI | 2 | 47 | 61 |
| 20 | HNA | MDI | 1 | 28 | 21 |

* Equivalent level of free nitroso compound.

EXAMPLE 6

Evidence for the efficiency of the NDPA/MDI urethane in generating rubber-bound antioxidants in four synthetic rubbers is summarized in Table 4. In the case of PB and NBR there is evidence that somewhat more efficient antioxidants are produced by using the urethane derivatives. The rubbers were all loaded with 50 pphr of carbon black.

TABLE 4

Rubber-bound antioxidants from the NDPA/MDI urethane in various synthetic rubber vulcanizate oxidized at 125°

| Formulation | Polymer | Additive | Equivalent loading (pphr) | Hours to 1% w/w absorption Unextracted | Extracted |
|---|---|---|---|---|---|
| B | SBR | NDPA | 2 | 35 | 36 |
| B | SBR | NDPA/MDI | 2 | 30 | 33 |
| C | PB | NDPA | 2 | 25 | 30 |
| C | PB | NDPA/MDI | 2 | 26 | 37 |
| D | CR | NDPA | 2 | 65 | 64 |
| D | CR | NDPA/MDI | 2 | 74 | 50 |
| E | NBR | NDPA | 2 | 41 | 41 |
| E | NBR | NDPA/MDI | 2 | 51 | 51 |

EXAMPLE 7

Results are shown in Table 5 below for the technological properties of vulcanizates of formulation F after extraction with methanol/acetone/chloroform azeotrope and before and after ageing for 2 days at 100°. It should be borne in mind that conventionally protected latex vulcanizates are untestable after extraction and ageing for 2 days at 100°.

TABLE 5

Technological ageing results on NR latex vulcanizates aged 2 days at 100° after extraction

| Additive | Equivalent loading (p.p.h.r.) | TS, kg./cm.$^{-2}$ Unaged | Aged | E.B., percent Unaged | Aged | M300, kg./cm.$^{-2}$ Unaged | Aged |
|---|---|---|---|---|---|---|---|
| NT/TDI | 1 | 343 | 22 | 850 | 700 | 16 | 5 |
| NT/TDI | 2 | 351 | 60 | 860 | 800 | 16.5 | 7 |

EXAMPLE 8

A major disadvantage in the use of NDPA and other aromatic nitroso compounds in dry rubber is the severe reduction in processing safety ("scorch") which accompanies the use of levels greater than 1 pphr. This originates from the accelerating action of the free nitroso compound. The effect of adding nitroso compounds as the urethanes is shown in Table 6.

TABLE 6

Mooney scorch at 120° of an NR gum CBS/S vulcanizate (formulation A)

| Additive | Equivalent loading (pphr) | Scorch time t+5/120° (min.) |
|---|---|---|
| None | — | 50.5 |
| NDPA | 0.5 | 24.7 |
| NDPA | 1.0 | 18.5 |
| None | — | 44.3 |
| NDPA/MDI | 0.5 | 34.5 |
| NDPA/MDI | 1.0 | 31.5 |
| 2 MNP | 1.0 | 25.2 |
| 2 MNP/PI | 1.0 | 33 |

EXAMPLE 9

It has been shown that the NDPA/MDI urethane gives improved scorch safety even when used in an internal mixer. An NR tire tread mix (RSS$_1$ 100, HAF black 45, ZnO 5, Process oil 5, Stearic acid 2) was mixed in a 7 minute cycle in a Banbury internal mixer according to the schedule:

```
        Chamber 50°
0 min      Rubber
3 min      ZnO stearic acid additive
4 min      ½ HAF
5 min      ½ HAF + oil
7 min      Dump
           (140–150°)
```

The Mooney scorch (t + 5) was measured at 120° giving the results

| | |
|---|---|
| NDPA (1 pphr) | 13.5 mins |
| NDPA/MDI (= NDPA 1) | 23.5 mins |

The advantage of using the urethane is manifest. The use of a urethane of lower decomposition point, e.g. NDPA/PI, might well not show the improvement in scorch.

EXAMPLE 10

The effect of NDPA in breaking down the rubber during reaction on an open mill has been noted as a disadvantage in the use of NDPA as it results in lower tensile strengths, particularly in gum vulcanizates. The beneficial effect of using an appropriate urethane has been demonstrated by measuring the Wallace Plasticities of rubbers during an extended milling process at a temperature of 100° on an open mill. The procedure was as follows:

25 g. of raw rubber was banded within two minutes on a 6 inches × 3 inches laboratory mill maintained at 100 ± 5°C., and the additive incorporated during the third minute. Mastication was continued with a 0.15 cm nip, which was progressively reduced as rubber was removed to maintain a similar bank of mix above the rolls. Small pieces of mix were removed at various times and the plasticities measured on a Wallace Rapid Plastimeter. The results are shown in Table 7, and demonstrate clearly that the use of the urethane has prevented peptization of the rubber.

TABLE 7

Effect of urethanes on peptization of NR during mastication on an open mill at 100°

Wallace Rapid Plasticity after mastication period (mins.)

| Additive (pphr*) | 2 | 5 | 7 | 8 | 11 | 13 | 17 | 26 |
|---|---|---|---|---|---|---|---|---|
| None | 75 | 63 | — | 55 | 51 | — | 44.5 | 38 |
| NDPA 1 | 60.5 | 29 | 17.5 | — | 17.2 | 16.8 | 15.9 | — |
| NDPA/ MDI 1 | 58 | 56.5 | 54.3 | 54 | — | 48 | 45 | 41 |

* Equivalent NDPA level.

EXAMPLE 11

NP/HW was added to latex formulation F as an aqueous dispersion and films cast and vulcanized. The p-nitrosophenol content was 0.99 pphr. The ageing of sheets before and after 24 hours hot azeotrope extraction is shown in Table 8.

TABLE 8

Urethane D generated rubber-bound antioxidant in a latex vulcanizate (cure time 30'/100°C.)

| Ageing Days/100° | Unextracted | | | Extracted | | |
|---|---|---|---|---|---|---|
| | TS | EB | $M_{300}$ | TS | EB | $M_{300}$ |
| 0 | 290 | 830 | 23 | 325 | 785 | 25 |
| 2 | 223 | 705 | 26 | 190 | 845 | 16 |

The results clearly show that an efficient rubber-bound antioxidant has been produced.

NP can hardly be added to NR latex as such, because aqueous dispersions of the free nitroso compound are rapidly oxidized. It is an advantage of this invention that NP urethanes can be added to NR latex.

While there is no reason, in principle, why nitrosoanilines or urethanes prepared therefrom should not be used in NR latex to protect the rubber from oxidative degradation, it should be borne in mind that amines generally discolor latex products rather badly.

We claim

1. A process for improving the resistance to degradation of an unsaturated natural or synthetic rubber by providing antioxidant groups bound to the rubber molecules, which process comprises providing a mixture of the rubber with a urethane having the general formula

$$X \!+\! NH \cdot CO \cdot O \cdot N = Q = Z)_m$$

where
  X is an organic group of functionality $m$,
  Q is an aromatic group in the quinonoid configuration,
  Z is an oxygen atom or an imino group, and
  $m$ is an integer equal to 1 or more, and heating the mixture at a temperature of up to 250°C for from 1 minute to several days.

2. A process as claimed in claim 1, wherein the amount of the urethane is such as to provide from 0.2 to 3.0 percent by weight of an aromatic nitroso compound on the weight of the rubber.

3. A process as claimed in claim 1, wherein X is an organic hydrocarbon group and $m$ is 1 or 2.

4. A process as claimed in claim 1, wherein the rubber is used in the form of a latex, an amount of the urethane to provide from 0.2 to 2.0 percent by weight of an aromatic nitroso compound on the weight of the rubber is mixed with the rubber latex, and the mixture is heated at a temperature of from 60° to 130° C for from 1 to 60 minutes.

5. A process as claimed in claim 1, wherein the rubber is used dry, an amount of the urethane to provide from 0.5 to 3.0 percent by weight of an aromatic nitroso compound on the weight of the rubber is mixed with the dry rubber, and the mixture is heated at a temperature of from 100° to 250°C for from 1 to 60 minutes.

6. A process as claimed in claim 1, wherein the heating step is also used to vulcanize the rubber.

* * * * *